Dec. 26, 1939.                    E. KRAMAR                    2,184,843
             METHOD AND MEANS FOR DETERMINING POSITION BY RADIO BEACONS
                        Filed April 18, 1935          3 Sheets-Sheet 1
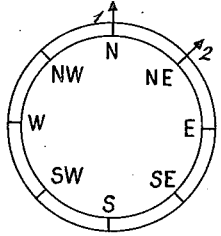
Fig. 1
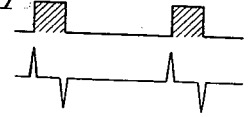
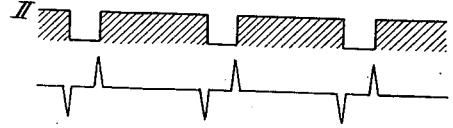
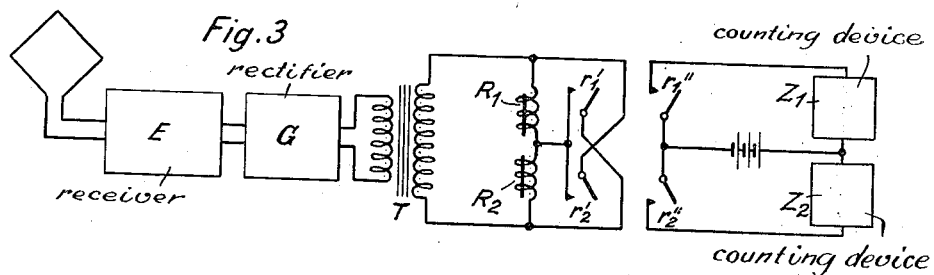
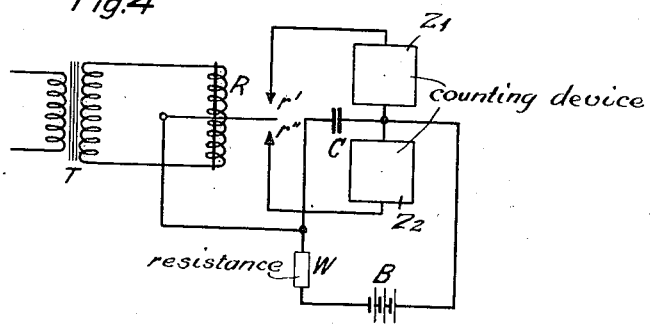
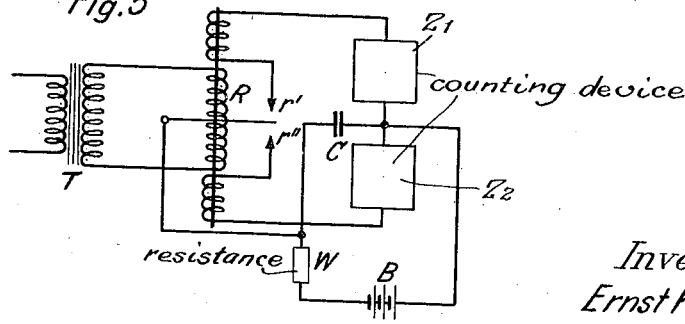
Inventor:
Ernst Kramar
by R.C. Hopgood
Attorney Dec. 26, 1939.                E. KRAMAR                  2,184,843
    METHOD AND MEANS FOR DETERMINING POSITION BY RADIO BEACONS
              Filed April 18, 1935        3 Sheets-Sheet 2

INVENTOR
ERNST KRAMAR
BY
ATTORNEY

Dec. 26, 1939.  E. KRAMAR  2,184,843
METHOD AND MEANS FOR DETERMINING POSITION BY RADIO BEACONS
Filed April 18, 1935  3 Sheets-Sheet 3
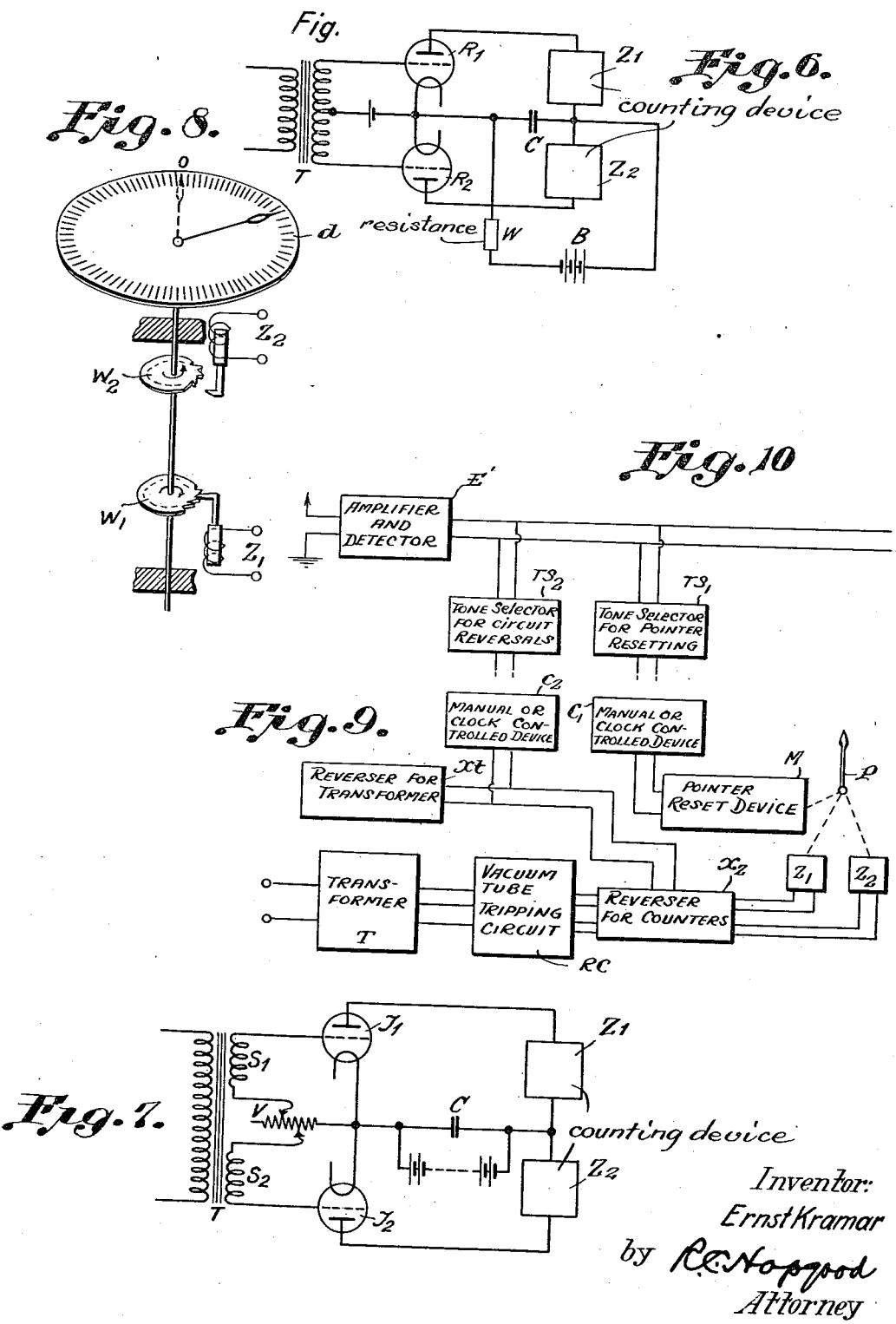

Patented Dec. 26, 1939

2,184,843

UNITED STATES PATENT OFFICE 2,184,843

METHOD AND MEANS FOR DETERMINING POSITION BY RADIO BEACONS

Ernst Kramar, Berlin-Tempelhof, Germany, assignor to C. Lorenz Aktiengesellschaft, Berlin-Tempelhof, Germany Application April 18, 1935, Serial No. 17,043
In Germany April 19, 1934

23 Claims. (Cl. 250—11)

The present invention relates to a system for determining the bearing of a movable aircraft, vessel or the like with respect to a radio transmission station of the type generally known as a "rotary beacon".

In the type of radio transmitting station known as a "non-rotary beacon" a radiation pattern is produced which defines a fixed center line extending through the radio station by directively radiating two different signals in such manner that one of these signals predominates on one side of said center line, while the other signal predominates on the other side of said center line, and said signals are of equal intensity on said center line. Ordinarily these two different signals consist of complementary codes, such as A and N (dot-dash and dash-dot, respectively) or, simply, dots for the signals on one side of the center line and complementary dashes for the signals on the other side of the center line. If the dots which compose one signal are truly complementary to the dashes which compose the other signal, a continuous dash signal will be heard along the center line where both signals are of equal intensity. Rotary beacons are also known in which a radiation pattern is produced exactly as in the case of a non-rotary beacon, but in which the complete radiation pattern is rotated so that the center line of equal intensity reception of the two signals constantly rotates, and in which the regions of predominant dot signals and predominant dash signals correspondingly rotate. Such rotary beacons also transmit in addition to the rotating radiation pattern consisting of two signals transmitted with different directional characteristics, a non-directional signal which is employed for synchronizing or timing purposes and which is transmitted in all directions at the instant when the center line of the rotating radiation pattern passes through a given direction, such as north. The method hitherto employed for determining the bearing of a movable craft with respect to such a rotary beacon was as follows: The non-directional signal and the two directional signals which form the rotating radiation pattern were both received at the moving craft, and the elapsed time between the reception of the non-directional signal and the moment when the center line of the rotating radiation pattern reached the craft was measured by a stop watch or other means. In order to facilitate the measurement of this time interval it has also been suggested that the number of signals, as for example, the number of dots and dashes transmitted from the beacon per second, should be definitely related to the rate of rotation of the rotating radiation pattern of this beacon, so that, for instance, fifteen dots and dashes are transmitted during each quadrant of rotation or one signal for each six degrees of rotation.

The present invention comprises both a new method of determining the bearing of a movable craft with respect to a rotary beacon of the above described type, and also a new structure for performing automatically and accurately the requisite steps for determining such a bearing by this new method.

The invention may be most easily understood by reference to the accompanying drawings, in which, Fig. 1 is a schematic representation of a cycle of operation of a transmitter;

Fig. 1A schematically represents the radiation pattern of a two-beam beacon suitable for use with the system of the present invention;

Fig. 2 represents the conversion of the received dots and dashes into positive and negative peaks or surges by means of a transformer;

Figs. 3 to 7, inclusive, show circuit arrangements for actuating a pair of counting devices to determine bearings in accordance with the present invention;

Fig. 8 illustrates how such a pair of counting devices may be arranged to actuate an indicator for indicating bearings in accordance with the present invention;

Fig. 9 is a schematic representation of a complete receiving equipment and bearing indicator in accordance with the present invention;

Fig. 10 represents tone responsive automatic apparatus which may be used instead of certain manually operated or clock operated apparatus in Fig. 9.

Figure 1A:
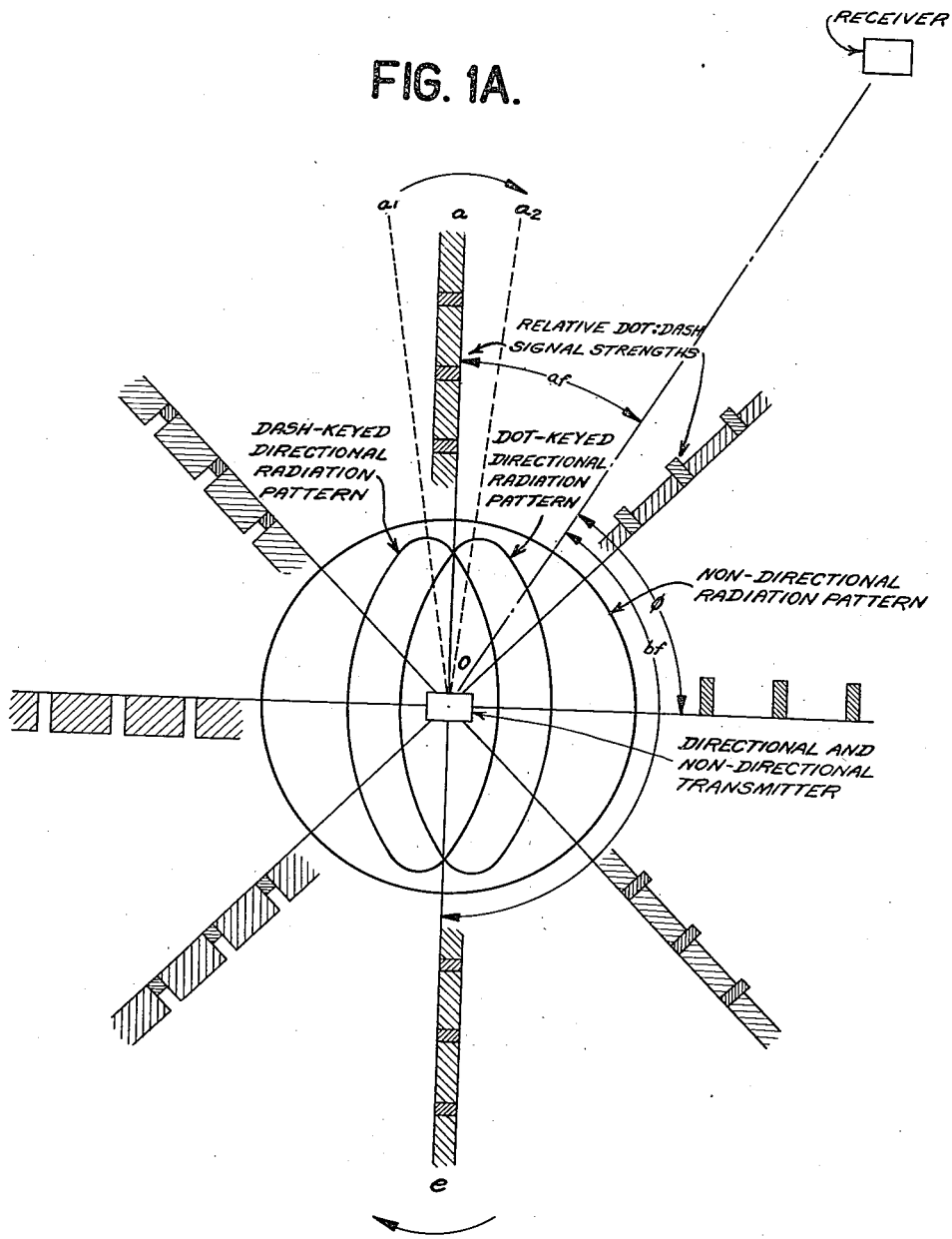

Referring to Fig. 1A, which represents the rotating radiation pattern of the transmitting station at the moment when the center line 0a is passing through the north direction, it will be noted that at this moment any receiving stations situated in the region east of the transmitter will receive predominantly dot signals, while any stations located west of the transmitter will receive dash signals. Along the center line 0a as well as the center line 0e, i. e. directly north or south of the transmitting station at the instant under consideration, the received signals will be neither predominantly dots nor dashes but will merge so as to form one continuous signal. Assuming that this whole radiation pattern is rotating clockwise at a rate so related to the rate of keying of the dots and dashes, that exactly fifteen dots, or dashes, are received during the period in which center line $\theta a$ rotates by ninety degrees, and assuming that a starting signal is transmitted in all directions at the instant when center line $\theta a$ passes through the north direction, it will be clear that a receiving station which is located thirty degrees east of north, for example, will receive five dots during the interval between the reception of the starting signal and the instant when center line $\theta a$ passes through this station, and will receive twenty-five dashes during the interval between the passage of line $\theta a$ through the station and the passage of line $\theta a$ through the south direction. Ordinarily the instant at which line $\theta a$ passes through the south direction is not marked in any manner and is therefore not readily determinable but as hereafter explained in accordance with my invention, the transmission of signals is terminated at the instant when center line $\theta a$ passes through the south direction, thus effectively marking this instant as well as the starting instant. Upon the assumption that the passage of line $\theta a$ through the receiving station could be exactly determined and that dots would be clearly heard up until the actual instant of such passage, the previously known method of counting the number of dots between the starting instant and the passage of line $\theta a$ would be fairly satisfactory. As a matter of fact, however, as line $\theta a$ approaches the direction of the receiving station the dot signals become gradually more and more indistinguishable and there will be for a certain receiver at a certain distance from the transmitter a zone $a_1$—$a_2$ in which neither the dots nor the dashes can be definitely distinguished. The width of this zone $a_1$—$a_2$ will depend not only upon the sensitivity of the receiver, but also on the total radiation strength of the transmitting beacon and the distance of the receiving station from this beacon. Therefore, any determination of a bearing by the hitherto employed method of counting the signals between the starting signal and the vanishing of the dot signal will be subject to an error equal to the angle $a_2\theta a$. In accordance with the invention however the whole number of the arriving signals of one type, such as dots, as well as that of the other signals, such as dashes, are ascertained and subtracted from each other.

If in the case of dots and dashes being keyed as complementary signals, the first kind of signals, i. e. the dots, are designated $a$, and the second kind of signals, i. e. the dashes, designated $b$, then in accordance with the novel method the position is ascertained, by the angle $\varphi$ from the zero signal, with the aid of the formula $$\varphi = \frac{b-a}{2} \cdot f$$

wherein $f$ denotes the number of degrees per signal, for instance 6° as stated herebefore, in other words, the average value is formed so that errors due to the width of radiation are eliminated. It will be noted that the angle $\varphi$ which is determined by the above simple subtraction formula does not represent the bearing of the observing station with respect to the starting direction of the beacon, i. e. with respect to the direction of center line $\theta a$ when the starting signal is given, nor the bearing with respect to the terminating direction of the beacon, but rather represents the bearing of the observer with respect to a direction midway between the direction of line $\theta a$ at the time of the starting signal and the direction of this line at the time of the termination signal. Thus, if it is assumed that the starting signal is given when line $\theta a$ passes through the north direction and that the signals are terminated when this line passes through the south direction, the bearing of the observer will be $\varphi$ degrees from the east direction.

This method is very reliable as long as the position to be determined is not located in the vicinity of zero, since then one of the signals is not mounted at all. The invention therefore further proposes to give the zero signal at at least two different times when the center-line is passing through at least two different directions, that is, to count from different initial points, for example in such a manner that according to Fig. 1 the non-directional starting signal is given when the equal intensity center line of the radiation pattern is passing through direction 1 (north) and is given a second time when this center line passes through direction 2 (north/east) different by 45° from direction 1. In this case it is necessary to indicate by the zero signal or another auxiliary signal, from which initial point the counting should be effected.

The novel method requires pauses to be made in the operation of the beacon. This is not necessary if the reception is made in the known manner by hearing, since here only the signals from the zero signal up to the arrival of the continuous dash line are counted. With the novel method however the entire number of signals before and after the continuous dash line is ascertained. It is necessary therefore to provide for a pause before the commencement and after the end of the signals in order that the signals transmitted during one cycle may be sharply separated from the signals transmitted during the next cycle, so that the receiving equipment can readily be designed to count the signals of each cycle separately. Besides it must be possible to determine the average value during the pause. In the practical operation this involves that in the case of a two-beam beacon no keying is allowed during 180° of rotation whereas with a four-beam beacon quadrants must alternately be omitted.

The upper curves I and II of Fig. 2 illustrate the general type of signal with which the receiving device should cooperate. The dot and dash signals radiated from the transmitter are designated I or II, respectively. They are complementary signals, that is the points and dashes are combined to form a continuous dash line, the dots being given in the intervals between the dashes. The transformers of the receiving device transfer the signals not in the actual shape thereof but transfer only voltage peaks of different directions, as is shown in Fig. 2 by the unnumbered curves below the signal curves I and II. From the direction of the voltage of the first impulse of a pair of rapidly successive impulses it can be ascertained whether a dot or a dash signal is concerned. In the representation, with the dot signal the first impulse is directed upward and with the complementary signal, i. e. the dash signal, the first impulse directed downward and the second directed upward. This fact has been utilized already for creating an automatic indicating instrument adapted for use with radio beacons, the principle here being to use behind the transformer an instrument which is very sensitive when its pointer is in the zero position but is insensitive as far as possible with deflected positions of the pointer. The first impulse throws the pointer outward in consequence of the high sensitivity which there is in the vicinity of the zero position. When hereupon the second impulse arrives, the pointer is in the field of little sensitivity so that it will be influenced by the same signal to a slight degree only. The first impulse thus determines the direction of the pointer deflection that is, the deviation from the continuous dash line. The same fundamental principle may be employed also for effecting the novel method. In other words, the receiving arrangement must be such that each kind of signal is separately counted and recorded according to its polarity and the subtraction then effected.

Fig. 3 shows a rectifier G included in the output circuit of the receiver E and connected to a transformer T. This transformer only acts to transfer the voltage peaks at the start and finish of each pulse, as explained already with reference to Fig. 2. The secondary of the transformer is connected to the windings of two relays R1 and R2. These relays are so arranged as to be sensitive to the direction of a current. With the impulse of one direction relay R1 attracts its armature and with the impulse of the opposite direction relay R2 becomes active. The contacts of these relays are so connected that the relay first cut in acts to short-circuit the other in order that the second relay shall no more be able to respond under the influence of the appertaining opposite impulse. This is effected by means of the contacts r1' or r2'. Additional relay contacts r1'' and r2'' are to actuate a counter Z1 or Z2 by which the individual signals are counted. The relays are slow releasing. To such end additional means such as condensers or the like may be provided. The times necessary for the retraction of the armatures are so great that the short-circuit for the other relay shall be maintained until the appertaining impulse of the opposite direction has arrived. After the counting has been finished the counters are returned into their position of rest either manually or automatically, viz. by means of a particular signal given by the transmitter. Also a clockwork may be employed for this purpose since, as stated herebefore, the pauses between the individual tests amount at least to 90° of the time of revolution and thus amount to a rather considerable time so that slight differences due to differences in the operation of the clockwork will for some time be without effect.

With the arrangement shown in Fig. 4 a relay R is employed whose armature is adapted to be deflected in either direction from a normal mid-position. The contacts thereof are designated r' and r''. Over these contacts a condenser C is discharged and this takes place (according to whether r' or r'' gets closed) over the counter Z1 or Z2. On the arrival of the appertaining impulse of the opposite direction condenser C has already been discharged since recharging it takes much more time than discharging thus only one of the counters will be active in any case. The condenser is charged by battery B over the series resistance W without this circuit requiring a particular contact device to be provided.

As this method is extremely swift and simple in operation, it may be employed, not only for the purposes stated herebefore but may be used in a general manner if signals of the same kind are to be discriminated according to their polarity.

The arrangement shown in Fig. 5 differs from that represented in Fig. 4 only by this that the relay whose armature moves both ways from a mid-position is fitted with holding windings which are active as long as the condenser C has not yet been discharged. It may be advantageous to retard the discharging of the condenser by dimensioning accordingly the resistance values of the circuit. It depends upon the duration of the dot or dash signals or other discriminative signals and on the speed with which the signals follow upon each other whether arrangements of this kind will be adapted for the purpose.

With the circuit arrangement represented in Fig. 6 the principle involved in Fig. 4 has still further been developed. Instead of the mechanical relays, tube relays R1 and R2 are here provided whose grid circuits are influenced by the impulses. Also here the condenser which is discharged or charged is included in the anode circuit. In the case of this arrangement it should be ensured that the resistance of the charging circuit of the condenser be greater than the tube resistance.

The counting arrangements described herebefore have still the disadvantage that their indications must be subtracted by the observer. This is avoided if in accordance with the further invention both counters are arranged to act on the same shaft, i. e. on the same pointer. In this case it is only necessary to bring the counter into the null position before the counting is begun. The null position is that position with respect to which the angle $\varphi$ indicates the bearing of the receiving station as previously explained. For a two-beam beacon this null position is 90° from the index direction through which the center line Oa is passing when the starting signal is given. For a four-beam beacon this null position to which the pointer is reset will correspondingly be 45° from the index direction. One kind of signals act to turn the pointer first to the left while the other will turn it to the right so that the pointer position thus obtained will indicate the actual position. Fig. 8 is an example of construction of such a counting arrangement. A pointer which moves over scale d is fixed to two toothed wheels W1 and W2 which are actuated by the counting mechanisms Z1 and Z2. The arrangement is made so that the counting mechanism Z1, for instance, upon being actuated turns the pointer clockwise over the scale, while the counting mechanism Z2 rotates the pointer in an inverse direction.

In order to eliminate errors which are due to inaccuracies of the arrangements used, especially a push-pull arrangement employed for separating the discriminative signals, the invention further proposes to reverse in the intervals between the individual counting actions the polarities of the transformer as well as of the counter. The direction in which the counter actuates the pointer is not changed by these two reversals, since the transformer reversal offsets the counter reversal.

This may be performed by a simple device by which on the one hand the input transformer and on the other hand the counter is subjected to a reversal of polarity so that the push-pull tube, having received the dots for example, shall thereafter receive the dashes, and vice versa. By employing this method after each counting, any error is automatically compensated.

Either the reversal of polarity may be effected manually, or after the counting action particular signals are sent out by the transmitter, such as a special tone filtered out by means of a tone selection, this special signal being used for effecting the reversal of polarity.

Alternatively a clockwork or another device operating in dependence upon time may be employed for effecting the reversal of polarity. For it is necessary as will be seen from the foregoing description, to provide for a pause after the counting has occurred, which may be done for instance by giving signals during certain quadrants only. The pauses obtained in this way are great enough to permit clockworks of a simple construction to be employed without additional means for synchronizing this arrangement being necessary.

Figs. 9 and 10 schematically represent sufficient of the receiving circuit to illustrate the above described polarity reversing counter resetting arrangement. As shown in Fig. 9, the signals after suitable amplification, detection, etc., are applied to transformer T and the peak pulses of this transformer trip the vacuum tube circuit RC as explained in connection with Fig. 7. The counting devices $Z_1$ and $Z_2$ are thus operated to rotate the pointer P to the left or right. The reversing devices $X_1$ and $X_2$ are adapted to reverse the polarity of transformer T and to correspondingly interchange counting devices $Z_1$ and $Z_2$ so that the actual motion of the pointer will be unchanged although the circuit components used for counting dots and dashes have been interchanged. Also, pointer reset device M is provided to reset the pointer before the next counting. As shown in Fig. 9, both the reset device and the reversing devices may be actuated by clock work or manually.

Alternatively the reversing devices and/or the resetting device may be controlled automatically by suitable tone devices, as shown in Fig. 10. Fig. 10 illustrates apparatus which should be substituted in place of the manually or clock operated devices $C_1$ and $C_2$ in Fig. 9. The apparatus of Fig. 10 includes an amplifier and detector E' fed from a suitable antenna as shown, and two tone selector devices $TS_1$ and $TS_2$. Each of these tone devices $TS_1$ and $TS_2$ includes suitable tone selection or tone filtering apparatus and each one is arranged to respond to a distinctive tone signal received over device E' from the antenna. Each of these tone devices $TS_1$ and $TS_2$ is adapted to control the reversing devices or the pointer reset device, thus replacing the corresponding manually operated or clock operated devices $C_1$ and $C_2$.

The push-pull tube arrangement may consist of controlled ionic valves.

Fig. 7 shows such an arrangement. The arriving signals are conducted to the transformer T after having undergone amplification, rectification, etc. These particulars form no part of the invention and are therefore not described. The transformer P has two secondaries $S_1$ and $S_2$, connected to the control grid of the ionic tubes $J_1$ or $J_2$, respectively. These tubes are for instance grid-controlled thyratrons. In the anode circuit common to the tubes are included the condenser C and the two counters $Z_1$ and $Z_2$ whose mode of operation is more fully explained herebefore. The grids of the thyratrons are not directly connected to the cathode but attached to it through a series resistance V. This resistance has two taps which can be adjusted at will.

The arrangement is so adjusted that in the state of rest of the arrangement the ionic tubes are just on the point of oscillating, that is to say, do not yet oscillate. As soon, however, as the signals arrive, a tripping action occurs in a similar manner to the separately synchronized tripping means used in the television art. This point is very easy to adjust. It is only necessary to regulate the arrangement, while in its condition of rest, by the tapping device of the resistance V until the ionic tube is self-oscillating, and then to alter this adjustment slightly until the tube shall no more oscillate. When the signals strike the arrangement thus adjusted, an additional grid bias is produced by which the tripping action is started. The tapping device consists of separate taps in order that differences of the ionic tubes can be compensated.

An advantage of this circuit arrangement is that the entire expenditure in means is reduced. This is of importance especially if the arrangement is to be employed on means of transportation, particularly on aircraft, because ionic tubes of this kind have a high power output while requiring a relatively small power input. In this way an additional amplifier stage may eventually be dispensed with. The chief advantage, however, is that a natural limitation of amplitudes is brought about in as much as the tripped amplitude is always the same in arrangements of this nature. This is advantageous mainly for the reasons stated hereafter.

With a rotating radio beacon the amplitude of the signals is subjected to fluctuations, as the final amplitude of the acting signal results from the differential value of the two fields; or in other words, as long as only the dot or only the dash signal is present the maximum amplitude is prevailing; on the signals intermerging the amplitude of the preponderating signal becomes gradually smaller as the center line Oa approaches the receiver. Finally when the receiver is exactly on this line there is no differential amplitude at all. This means that the controlling voltages for the ionic tubes are of different magnitudes. By the use of relays or thyratron tubes as previously described, my invention provides an unvarying controlling current for the counters as long as the signals have sufficient differential amplitude to be detected at all. By the novel method of counting signals both before and after the apparent dead period, the errors due to dropping out weak signals in the region near the center line are eliminated. Also, the errors due to dissymmetry between the two thyratrons or relays which are used for detecting these weak signals are eliminated by the reversal mechanism which interchanges these thyratrons or relays. Thus the counter windings are energized by pulses of current whose magnitude is independent of the differential signal amplitude and whose number is so compensated that variations in the signal amplitude introduce no error in the counting.

What is claimed is:

1. For determining position in cooperation with that type of transmitter which produces a rotating radiation pattern in one region of which signals of a first kind, such as dots, predominate and in another region of which signals of a second kind, such as dashes, predominate, the signals being less distinguishable in those regions which are closer to a central reference line of the rotating pattern and the total number of signals transmitted between a given starting instant and a given terminating instant bearing a fixed relation to the total angle traversed by said rotating radiation pattern between the said instants, the method of determining the position of a point relative to said transmitter which comprises receiving said signals at said point and separately counting the distinguishable signals of said first kind and the distinguishable signals of said second kind which are received between said starting instant and said terminating instant and then obtaining the difference between the numbers of such signals so received.

2. For determining position in cooperation with that type of transmitter which produces a cyclically rotating radiation pattern comprising regions divided by a center line in one of which regions signals of a first type predominate and in another of which regions signals of a second type predominate, the total number of signals transmitted in a cycle and the total angle through which said pattern rotates in a cycle being predetermined, the method of determining an observer's direction relative to said transmitter which comprises receiving the signals of said first and second kinds during one cycle and subtracting the number of distinguishable signals of one kind so received from the number of distinguishable signals of the other kind so received during said cycle.

3. A method according to claim 1 in which different instants are chosen as said starting instant in accordance with different positions of the point to be located, whereby at every position of said point the direction from said transmitter is precisely determined.

4. A system for determining position comprising a transmitter which produces a rotating radiation pattern, having two regions separated by a center line in one of which regions signals of a first type predominate and in the other of which signals of a second type predominate, a predetermined number of signals being transmitted during a given cycle, and a predetermined angle being swept through by said rotating center line during said same cycle, means for indicating the start of said cycle and the termination of said cycle, a receiving device movable relative to said transmitter, means in said receiving device for separately responding to signals of said first and second types, and an indicator adapted to indicate the difference between the numbers of said first and second types of signals received in said given cycle.

5. A system for determining position comprising a transmitter which produces a rotating radiation pattern, having two regions separated by a center line in one of which regions signals of a first type predominate and in the other of which signals of a second type predominate, a predetermined number of signals being transmitted during a given cycle, and a predetermined angle being swept through by said rotating center line during said same cycle, means for indicating the start of said cycle and the termination of said cycle, a receiving device movable relative to said transmitter, means in said receiving device for separately responding to signals of said first and second types, and including means variably responsive in dependence upon the number of signals of said first type and the number of signals of said second type received during said given cycle.

6. A system according to claim 4 further comprising means at the transmitter for indicating an intermediate instant between the start and termination of said cycle.

7. A system according to claim 5 further comprising means synchronized with said transmitter for indicating an intermediate instant between the start and termination of said cycle.

8. A system according to claim 5 further comprising means connected to control the transmitter for interrupting the transmission of signals between cycles.

9. A system according to claim 5 in which said transmitter includes elements rotating to produce said rotating radiation pattern and in which means are connected to control said transmitter for suppressing the transmission of signals during a rotation of 180° of said rotating element.

10. A system according to claim 5 wherein said receiving device comprises a signal receiver responsive to signals of both said types and having an output circuit, and wherein said means in said receiving device for separately responding comprise a transformer coupled to the output of said receiver, a combination of relays operable in response to signal energy through said transformer, and connections whereby the operation of certain of said relays in response to one kind of signal inhibits the operation of others of said relays in response to the reception of another kind of signal.

11. A system according to claim 4 wherein said receiving device comprises a signal receiver responsive to signals of both said types and having an output circuit, and wherein said means in said receiving device for separately responding comprise a transformer coupled to the output of said receiver, a centrally biased polar relay actuated over said transformer, a condenser, a charging circuit for said condenser having a time constant greater than the length of the shortest element of said signals, registering apparatus, connections whereby upon the deflection of said polar relay said condenser is discharged through said registering apparatus.

12. A system according to claim 5 wherein said receiving device comprises a signal receiver responsive to signals of both said types and having an output circuit, and wherein said means in said receiving device for separately responding comprise a transformer, a push-pull thermionic tube circuit coupled through said transformer to the output of said receiver, a condenser connected in the common branch of said push-pull circuit, a delayed charging circuit for said condenser, and wherein said indicating means variably responsive comprise a pair of registering devices connected in the separate branches of said push-pull circuit.

13. A system according to claim 4 wherein said receiving device comprises a signal receiver responsive to signals of both said types and wherein said means in said receiving device for separately responding comprise separate counting mechanism operable by said receiver for counting said first and second types of signals, and means for actuating said indicator in one direction in response to the operation of one of said counting mechanisms and in the other direction in response to the other of said counting mechanisms.

14. A system according to claim 4 comprising a means for emitting a special signal from said transmitter after the completion of said given cycle and means associated with the receiver and responsive to said special signal for resetting the indicator of said receiver to a predetermined position.

15. A position determining receiving apparatus for use with a rotating beacon which produces a rotating radiation pattern having two regions separated by a rotating center line, in which in one of the regions signals of one type predominate and in the other region signals of a second type predominate, comprising a signal receiver for receiving said beacon signals, a transformer, an indicating mechanism, connections whereby signals received by said receiver are transmitted through said transformer to said indicating mechanism, and means for reversing the polarities of said transformer and said indicating mechanism in timed relation with the change of type of said received beacon signals.

16. A system according to claim 4 further comprising means synchronized with the transmitter for sending out special polarity reversal signals, and wherein said receiving device comprises a signal receiver responsive to signals of both said types and having an output and wherein said means in said receiving device for separately responding comprise a transformer, connected to the output of said receiver, and to said indicator, and means controlled by the said receiver responsive to the reception of said special polarity reversal signal to reverse the connections of said transformer and said indicator.

17. A position determining receiving apparatus for use with a rotating beacon which produces a rotating radiation pattern having two regions separated by a rotating center line, in which in one of the regions signals of one type predominate and in the other signals of a second type predominate, comprising a signal receiver for receiving said beacon signals, a transformer, an indicating mechanism, connections whereby the signal received by said receiver is transmitted through said transformer to said indicating mechanism, and clockwork timing means operating in timed relation to said beacon at said receiving station for controlling the operation of said connections.

18. A system according to claim 4 wherein said receiving device comprises a signal receiver responsive to signals of both said types and wherein said means in said receiving device for separately responding comprise a pair of gas-filled electron discharge tubes, connections whereby voltages derived from the signals received by said receiver are applied in opposite sense to said two electron discharge tubes whereby one or the other of said tubes becomes ionized, and connections whereby said indicator is operated by said tubes.

19. A system according to claim 5 wherein said receiving device comprises a signal receiver responsive to signals of both said types and wherein said means in said receiving device for separately responding comprise a pair of gas-filled electron discharge tubes, connections whereby voltages derived from the signals received by said receiver are applied in opposite sense to said two electron discharge tubes whereby one or the other of said tubes becomes ionized (and connections whereby said variably responsive indicating means are operated by said tubes.

20. A system according to claim 4 wherein said receiving device comprises a signal receiver responsive to signals of both said types and wherein said means in said receiving device for separately responding comprise a pair of gas-filled electronic discharge tubes, biasing-potential sources for said tubes whereby the latter are normally maintained slightly below their ionization potentials, means for transmitting signals from said receiver to said electronic discharge tubes whereby at least one of these tubes is caused to oscillate, said means for operating said indicator under the control of said tubes.

21. A direction determining apparatus for determining the direction between said apparatus and a transmitter of the type which produces a rotating radiation pattern in one region of which signals of a first type are transmitted and in a second region of which signals of a second type are transmitted, the signals being transmitted at a predetermined rate relative to the rotation of said radiation pattern, which comprises means for receiving signals of said first type, means for receiving signals of said second type, and means for separately registering the number of signals of each type.

22. A direction determining apparatus for determining the direction between said apparatus and a transmitter of the type which produces a rotating radiation pattern in one region of which signals of a first type are transmitted and in a second region of which signals of a second type are transmitted, the signals being transmitted at a predetermined rate relative to the rotation of said radiation pattern, which comprises means for receiving signals of said first type, means for receiving signals of said second type, and means for indicating the difference between the number of signals of the first type and the number of signals of the second type which are received.

23. For precisely determining the bearing of an unknown point relative to a rotating radiation pattern which comprises two kinds of signals predominating in different regions of the pattern, the total number of signals transmitted during a given amount of rotation of the radiation pattern being fixed, the method which comprises the following steps: receiving both the signals of said first kind and the signals of said second kind, determining the difference between the number of the signals of the first kind and the number of signals of said second kind, from this difference determining the angle of the bearing between the unknown point and the center of the rotating radiation pattern.

ERNST KRAMAR.